United States Patent
Yunbai

(10) Patent No.: US 11,243,380 B2
(45) Date of Patent: Feb. 8, 2022

(54) IMAGING LENS COMPRISING FIVE LENSES OF +-0+- REFRACTIVE POWERS

(71) Applicant: TOKYO VISIONARY OPTICS CO., LTD., Tokyo (JP)

(72) Inventor: Huang Yunbai, Sukagawa (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 0 days.

(21) Appl. No.: 16/525,053

(22) Filed: Jul. 29, 2019

(65) Prior Publication Data

US 2020/0225448 A1 Jul. 16, 2020

(30) Foreign Application Priority Data

Jul. 30, 2018 (JP) .............................. JP2018-142118

(51) Int. Cl.
*G02B 13/00* (2006.01)
*G02B 9/60* (2006.01)

(52) U.S. Cl.
CPC ............ *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS

2018/0081152 A1 3/2018 Dai et al.
2018/0239114 A1* 8/2018 Hsueh ...................... G02B 9/60

FOREIGN PATENT DOCUMENTS

JP 6228305 11/2017

* cited by examiner

*Primary Examiner* — Wen Huang
(74) *Attorney, Agent, or Firm* — Hamre, Schumann, Mueller & Larson, P.C.

(57) ABSTRACT

There is provided an imaging lens with excellent optical characteristics which satisfies demand of the wide field of view, the low-profileness and the low F-number. An imaging lens comprises, in order from an object side to an image side, a first lens having a convex surface facing the object side and positive refractive power near an optical axis, a second lens having negative refractive power near the optical axis, a third lens having aspheric surfaces on both sides, a fourth lens, and a fifth lens having a concave surface facing the image side and the negative refractive power near the optical axis, wherein an image-side surface of said fifth lens is formed as an aspheric surface having at least one pole point in a position off the optical axis, and predetermined conditional expressions are satisfied.

8 Claims, 8 Drawing Sheets

IMAGING LENS COMPRISING FIVE LENSES OF +-0+- REFRACTIVE POWERS

The present application is based on and claims priority of a Japanese patent application No. 2018-142118 filed on Jul. 30, 2018, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device, and more particularly relates to an imaging lens which is built in a smartphone and a mobile phone which become increasingly compact and excellent in performance, an information terminal such as a PDA (Personal Digital Assistant), a game console, PC and a robot, and moreover, a home appliance with camera function, a monitoring camera and an automobile.

Description of the Related Art

In recent years, it becomes common that camera function is mounted in a home appliance, information terminal equipment, an automobile and public transportation. Demand of products with the camera function is more increased, and development of various products is being made accordingly.

The imaging lens mounted in such equipment is required to be compact and to have high-resolution performance.

As a conventional imaging lens aiming high performance, for example, the imaging lens disclosed in Patent Document 1 has been known.

Patent Document 1 (JP Patent 6228305) discloses an imaging lens comprising, in order from an object side to an image side, a first lens with positive refractive power having a convex surface facing the object side, a second lens with negative refractive power having a concave surface facing the image side, a third lens with refractive power, a fourth lens with the refractive power, and a fifth lens with the negative refractive power, wherein a combination lens of said third lens and said fourth lens has negative refractive power.

SUMMARY OF THE INVENTION

However, in lens configurations disclosed in the Patent Document 1, when wide field of view, low-profileness and low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view, the low-profileness and the low F-number in well balance and excellently corrects aberrations.

Regarding terms used in the present invention, "a convex surface", "a concave surface" or "a plane surface" of lens surfaces implies that a shape of the lens surface near an optical axis (paraxial portion). "Refractive power" implies the refractive power near the optical axis. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens having a convex surface facing the object side and positive refractive power near an optical axis, a second lens having negative refractive power near the optical axis, a third lens having aspheric surfaces on both sides, a fourth lens, and a fifth lens having a concave surface facing the image side and the negative refractive power near the optical axis, wherein an image-side surface of the fifth lens is formed as an aspheric surface having at least one pole point in a position off the optical axis.

According to the imaging lens having the above-described configuration, the first lens properly corrects spherical aberration and distortion by having the convex surface facing the object side near the optical axis. The second lens properly corrects the spherical aberration and chromatic aberration occurring at the first lens. The third lens properly corrects aberrations at a peripheral area by the aspheric surfaces on both sides. The fourth lens properly corrects astigmatism, field curvature and the distortion. The fifth lens properly corrects the chromatic aberration, the astigmatism, the field curvature and the distortion. An image-side surface of the fifth lens is a concave surface facing the image side near the optical axis, and the field curvature and the distortion can be more properly corrected and a light ray incident angle to an image sensor can be properly controlled by forming as the aspheric surface having at least one pole point in a position off the optical axis.

According to the imaging lens having the above-described configuration, it is preferable that an image-side surface of the first lens is a concave surface facing the image side near the optical axis.

When the image-side surface of the first lens is the concave surface facing the image side near the optical axis, the astigmatism and the distortion can be properly corrected.

According to the imaging lens having the above-described configuration, it is preferable that an object-side surface and an image-side surface of the third lens are formed as plane surfaces near the optical axis.

When the object-side surface and the image-side surface of the third lens are plane surfaces near the optical axis, the astigmatism, the field curvature and the distortion at the peripheral area can be properly corrected by the aspheric surfaces on both sides without affecting a focal length of an overall optical system of the imaging lens.

According to the imaging lens having the above-described configuration, it is preferable that the fourth lens has the positive refractive power near the optical axis.

When the refractive power of the fourth lens is positive, the low-profileness is more facilitated.

According to the imaging lens having the above-described configuration, it is preferable that an object-side surface of the fourth lens is a concave surface facing the object side near the optical axis.

When the object-side surface of the fourth lens is the concave surface facing the object side near the optical axis, the astigmatism, the field curvature and the distortion can be properly corrected.

According to the imaging lens having the above-described configuration, it is preferable that an object-side surface of the fifth lens is a convex surface facing the object side near the optical axis.

When the object-side surface of the fifth lens is the convex surface facing the object side near the optical axis, the astigmatism and the distortion can be properly corrected.

According to the imaging lens having the above-described configuration, it is preferable that a below conditional expression (1) is satisfied:

$$0.70 < vd3/vd4 < 1.30 \tag{1}$$

where vd3: an abbe number at d-ray of the third lens, and vd4: an abbe number at d-ray of the fourth lens.

The conditional expression (1) defines an appropriate range of the abbe numbers at d-ray of the third lens and the fourth lens. By satisfying the conditional expression (1), the chromatic aberration can be properly corrected.

According to the imaging lens having the above-described configuration, it is preferable that a below conditional expression (2) is satisfied:

$$0.40 < r2/f < 1.20 \tag{2}$$

where r2: paraxial curvature radius of an image-side surface of the first lens, and f: a focal length of the overall optical system of the imaging lens.

The conditional expression (2) defines an appropriate range of the paraxial curvature radius of the image-side surface of the first lens. When a value is below the upper limit of the conditional expression (2), the astigmatism can be properly corrected. On the other hand, when the value is above the lower limit of the conditional expression (2), the spherical aberration can be properly corrected.

According to the imaging lens having the above-described configuration, it is preferable that a below conditional expression (3) is satisfied:

$$2.20 < r9/f < 6.00 \tag{3}$$

where r9: paraxial curvature radius of an object-side surface of the fifth lens, and f: a focal length of the overall optical system of the imaging lens.

The conditional expression (3) defines an appropriate range of the paraxial curvature radius of the object-side surface of the fifth lens. When a value is below the upper limit of the conditional expression (3), the field curvature can be properly corrected. On the other hand, when the value is above the lower limit of the conditional expression (3), the astigmatism and the distortion can be properly corrected.

According to the imaging lens having the above-described configuration, it is preferable that a below conditional expression (4) is satisfied:

$$0.55 < (T1/f) \times 100 < 1.40 \tag{4}$$

where

T1: a distance along the optical axis from an image-side surface of the first lens to an object-side surface of the second lens, and f: a focal length of the overall optical system of the imaging lens.

The conditional expression (4) defines an appropriate range of a distance along the optical axis between the first lens and the second lens. By satisfying the conditional expression (4), coma aberration and the astigmatism can be properly corrected.

According to the imaging lens having the above-described configuration, it is preferable that a below conditional expression (5) is satisfied:

$$7.50 < f2/f5 < 19.50 \tag{5}$$

where f2: a focal length of the second lens, and f5: a focal length of the fifth lens.

The conditional expression (5) defines an appropriate range of refractive powers of the second lens and the fifth lens. By satisfying the conditional expression (5), the coma aberration, the astigmatism and the distortion can be properly corrected.

According to the imaging lens having the above-described configuration, it is preferable that a below conditional expression (6) is satisfied:

$$2.80 < (T4/f) \times 100 < 9.00 \tag{6}$$

where

T4: a distance along the optical axis from an image-side surface of the fourth lens to an object-side surface of the fifth lens, and f: a focal length of the overall optical system of the imaging lens.

The conditional expression (6) defines an appropriate range of a distance along the optical axis between the fourth lens and the fifth lens. By satisfying the conditional expression (6), the astigmatism and the distortion can be properly corrected.

According to the imaging lens having the above-described configuration, it is preferable that a below conditional expression (7) is satisfied:

$$0.05 < T1/T2 < 0.18 \tag{7}$$

where

T1: a distance along the optical axis from an image-side surface of the first lens to an object-side surface of the second lens, and T2: a distance along the optical axis from an image-side surface of the second lens to an object-side surface of the third lens.

The conditional expression (7) defines an appropriate range of a distance between the first lens and the second lens and a distance between the second lens and the third lens. By satisfying the conditional expression (7), difference of the distance between the first lens and the second lens and the distance between the second lens and the third lens is suppressed from being large, and the low-profileness is achieved. Furthermore, by satisfying the conditional expression (7), the coma aberration, the astigmatism and the distortion can be properly corrected.

According to the imaging lens having the above-described configuration, it is preferable that a below conditional expression (8) is satisfied:

$$0.70 < D3/T3 < 1.40 \tag{8}$$

where

D3: a thickness along the optical axis of the third lens, and

T3: a distance along the optical axis from an image-side surface of the third lens to an object-side surface of the fourth lens.

The conditional expression (8) defines an appropriate range of a thickness along the optical axis of the third lens. When a value is below the upper limit of the conditional expression (8), the thickness along the optical axis of the third lens is suppressed from being too large, and air gaps of the object side and the image side of the third lens can be easily secured. As a result, the low-profileness can be achieved. On the other hand, when the value is above the lower limit of the conditional expression (8), the thickness along the optical axis of the third lens is suppressed from being too small, and formability of the lens becomes excellent. Furthermore, by satisfying the conditional expression (8), the astigmatism and the distortion can be properly corrected.

According to the imaging lens having the above-described configuration, it is preferable that a below conditional expression (9) is satisfied:

$$1.80 < D4/T4 < 3.50 \qquad (9)$$

where

D4: a thickness along the optical axis of the fourth lens, and

T4: a distance along the optical axis from an image-side surface of the fourth lens to an object-side surface of the fifth lens.

The conditional expression (9) defines an appropriate range of a thickness along the optical axis of the fourth lens. When a value is below the upper limit of the conditional expression (9), the thickness along the optical axis of the fourth lens is suppressed from being too large, and air gaps of the object side and the image side of the fourth lens can be easily secured. As a result, the low-profileness can be achieved. On the other hand, when the value is above the lower limit of the conditional expression (9), the thickness along the optical axis of the fourth lens is suppressed from being too small, and formability of the lens becomes excellent. Furthermore, by satisfying the conditional expression (9), the astigmatism, the field curvature and the distortion can be properly corrected.

According to the imaging lens having the above-described configuration, it is preferable that a below conditional expression (10) is satisfied:

$$0.40 < r3/f < 1.15 \qquad (10)$$

where r3: paraxial curvature radius of an object-side surface of the second lens, and f: a focal length of the overall optical system of the imaging lens.

The conditional expression (10) defines an appropriate range of the paraxial curvature radius of the object-side surface of the second lens. When a value is below the upper limit of the conditional expression (10), the field curvature can be properly corrected. On the other hand, when the value is above the lower limit of the conditional expression (10), the distortion can be properly corrected.

According to the imaging lens having the above-described configuration, it is preferable that a below conditional expression (11) is satisfied:

$$0.50 < r3/r4 < 1.45 \qquad (11)$$

where r3: paraxial curvature radius of an object-side surface of the second lens, and r4: paraxial curvature radius of an image-side surface of the second lens.

The conditional expression (11) defines an appropriate range of paraxial curvature radii of the object-side surface and the image-side surface of the second lens. By satisfying the conditional expression (11), the astigmatism and the distortion can be properly corrected.

According to the imaging lens having the above-described configuration, it is preferable that a below conditional expression (12) is satisfied:

$$f2/f < -3.50 \qquad (12)$$

where f2: a focal length of the second lens, and f: a focal length of the overall optical system of the imaging lens.

The conditional expression (12) defines an appropriate range of refractive power of the second lens. By satisfying the conditional expression (12), the distortion is properly corrected and the low-profileness is achieved.

According to the imaging lens having the above-described configuration, it is preferable that a below conditional expression (13) is satisfied:

$$TTL/EPd \leq 2.30 \qquad (13)$$

where

TTL: a total track length, and

EPd: an entrance pupil diameter.

The conditional expression (13) defines a relationship between the total track length and the entrance pupil diameter. By satisfying the conditional expression (13), the total track length can be shortened, decrease in light quantity at the peripheral area can be suppressed and an image having sufficient brightness from a center to a peripheral area can be obtained.

According to the imaging lens having the above-described configuration, it is preferable that a below conditional expression (14) is satisfied:

$$-1.00 < (D2/f2) \times 100 < -0.55 \qquad (14)$$

where

D2: a thickness along the optical axis of the second lens, and f2: a focal length of the second lens.

The conditional expression (14) defines an appropriate range of a thickness along the optical axis of the second lens. When a value is below the upper limit of the conditional expression (14), the thickness along the optical axis of the second lens is suppressed from being too small, and the formability of the lens becomes excellent. On the other hand, when the value is above the lower limit of the conditional expression (14), the thickness along the optical axis of the second lens is suppressed from being too large, air gaps on the object side and the image side of the second lens can be easily secured. As a result, the low-profileness can be realized. Furthermore, by satisfying the conditional expression (14), the coma aberration and the distortion can be properly corrected.

According to the imaging lens having the above-described configuration, it is preferable that a below conditional expression (15) is satisfied:

$$0.50 < f1/f < 1.65 \qquad (15)$$

where f1: a focal length of the first lens, f: a focal length of the overall optical system of the imaging lens.

The conditional expression (15) defines an appropriate range of the refractive power of the first lens. When a value is below the upper limit of the conditional expression (15), positive refractive power of the first lens becomes appropriate, and the low-profileness can be achieved. On the other hand, when the value is above the lower limit of the conditional expression (15), the spherical aberration, the astigmatism and the distortion can be properly corrected.

According to the imaging lens having the above-described configuration, it is preferable that composite refractive power of the second lens and the third lens is negative, and more preferable that a below conditional expression (16) is satisfied:

$$-13.00 < f23/f < -3.50 \qquad (16)$$

where f23: a composite focal length of the second lens and the third lens, and f: a focal length of the overall optical system of the imaging lens.

When the composite refractive power of the second lens and the third lens is negative, it is favorable for correction of the chromatic aberration. The conditional expression (16) defines an appropriate range of the composite refractive power of the second lens and the third lens. When a value is below the upper limit of the conditional expression (16), the negative composite refractive power of the second lens and the third lens becomes appropriate, and the low-profileness can be achieved. On the other hand, when the value is above the lower limit of the conditional expression (16), the astigmatism and the distortion can be properly corrected.

According to the imaging lens having the above-described configuration, it is preferable that composite refractive power of the fourth lens and the fifth lens is positive, and more preferable that a below conditional expression (17) is satisfied:

$$45.00 < f45/f \qquad (17)$$

where f45: a composite focal length of the fourth lens and the fifth lens, and f: a focal length of the overall optical system of the imaging lens.

When the composite refractive power of the fourth lens and the fifth lens is positive, it is favorable for the low-profileness. The conditional expression (17) defines an appropriate range of the composite refractive power of the fourth lens and the fifth lens. By satisfying the conditional expression (17), the astigmatism, the field curvature and the distortion can be properly corrected.

Effect of Invention

According to the present invention, there can be provided an imaging lens with high resolution which satisfies demand of the wide field of view, the low-profileness and the low F-number in well balance, and properly corrects aberrations.

DETAILED DESCRIPTION OF THE PREFERRED EMBODIMENT

Hereinafter, the preferred embodiments of the present invention will be described in detail referring to the accompanying drawings.

FIGS. 1, 3, 5 and 7 are schematic views of the imaging lenses in Examples 1 to 4 according to the embodiments of the present invention, respectively.

Figure 1:
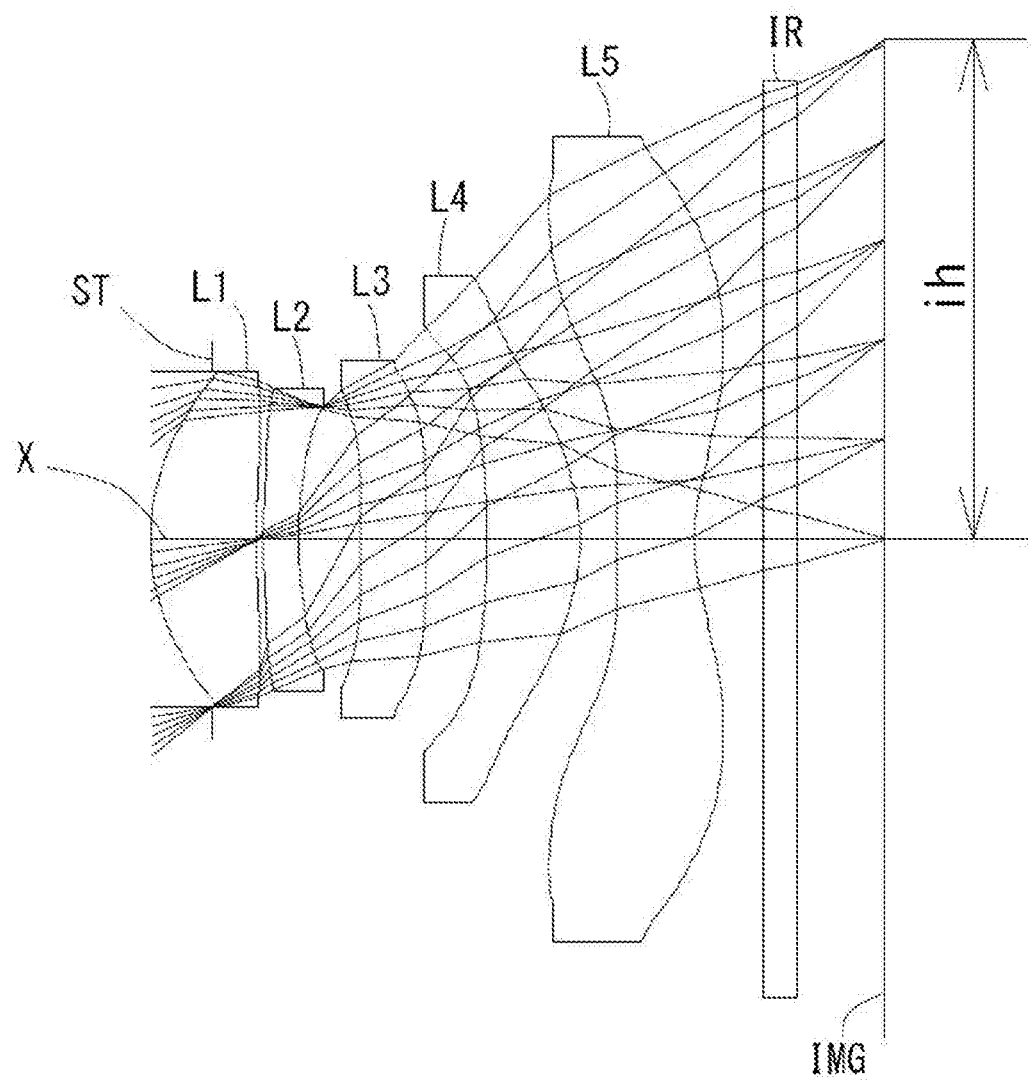
FIG. 1 is a schematic view showing an imaging lens in Example 1 according to the present invention.

As shown in FIG. 1, the imaging lens according to the present embodiment comprises, in order from an object side to an image side, a first lens L1 having a convex surface facing the object side and positive refractive power near an optical axis X, a second lens L2 having negative refractive power near the optical axis X, a third lens L3 having aspheric surfaces on both sides, a fourth lens L4, and a fifth lens L5 having a concave surface facing the image side and the negative refractive power near the optical axis X. An image-side surface of the fifth lens L5 is formed as an aspheric surface having at least one pole point in a position off the optical axis X.

A filter IR such as an IR cut filter and a cover glass are arranged between the fifth lens L5 and an image plane IMG (namely, the image plane of an image sensor). The filter IR is omissible.

By arranging an aperture stop ST on the object side of the first lens L1, correction of aberrations and control of an incident angle of the light ray of high image height to the image sensor become facilitated.

The first lens L1 has the positive refractive power and has a meniscus shape having a convex surface facing the object side and a concave surface facing the image side near the optical axis X. Therefore, spherical aberration, astigmatism and distortion can be properly corrected.

The second lens L2 has the negative refractive power and has a meniscus shape having a convex surface facing the object side and a concave surface facing the image side near the optical axis X. Therefore, the spherical aberration, chromatic aberration, the astigmatism and the distortion can be properly corrected.

The third lens L3 has plane surfaces facing the object side and the image side near the optical axis X and substantially has no refractive power near the optical axis X. In this case, the astigmatism, the field curvature and the distortion at a peripheral area can be properly corrected by the aspheric surfaces on both sides without affecting a focal length of the overall optical system of the imaging lens.

The fourth lens L4 has the positive refractive power and has a meniscus shape having a concave surface facing the object side and a convex surface facing the image side near the optical axis X. Therefore, a light ray incident angle to the fourth lens L4 becomes appropriate, and the astigmatism, the field curvature and the distortion can be properly corrected.

The fifth lens L5 has the negative refractive power and has a meniscus shape having a convex surface facing the object side and a concave surface facing the image side near the optical axis X. Therefore, the chromatic aberration, the astigmatism, the field curvature and the distortion can be properly corrected.

An object-side surface and an image-side surface of the fifth lens L5 are formed as the aspheric surfaces having at least one pole point in a position off the optical axis X. Therefore, the field curvature and the distortion can be properly corrected and a light ray incident angle to an image sensor can be properly controlled.

Regarding the imaging lens according to the present embodiments, it is preferable that all lenses of the first lens L1 to the fifth lens L5 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with the case in which a cemented lens is used, workload is reduced, and manufacturing in low cost becomes possible.

Furthermore, the imaging lens according to the present embodiments makes manufacturing facilitated by using a plastic material for all of the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the below conditional expressions (1) to (17).

$$0.70 < vd3/vd4 < 1.30 \tag{1}$$

$$0.40 < r2/f < 1.20 \tag{2}$$

$$2.20 < r9/f < 6.00 \tag{3}$$

$$0.55 < (T1/f) \times 100 < 1.40 \tag{4}$$

$$7.50 < f2/f5 < 19.50 \tag{5}$$

$$2.80 < (T4/f) \times 100 < 9.00 \tag{6}$$

$$0.05 < T1/T2 < 0.18 \tag{7}$$

$$0.70 < D3/T3 < 1.40 \tag{8}$$

$$1.80 < D4/T4 < 3.50 \tag{9}$$

$$0.40 < r3/f < 1.15 \tag{10}$$

$$0.50 < r3/r4 < 1.45 \tag{11}$$

$$f2/f < -3.50 \tag{12}$$

$$TTL/EPd \leq 2.30 \tag{13}$$

$$-1.00 < (D2/f2) \times 100 < -0.55 \tag{14}$$

$$0.50 < f1/f < 1.65 \tag{15}$$

$$-13.00 < f23/f < -3.50 \tag{16}$$

$$45.00 < f45/f \tag{17}$$

where
vd3: an abbe number at d-ray of the third lens L3,
vd4: an abbe number at d-ray of the fourth lens L4,
D2: a thickness along the optical axis X of the second lens L2,
D3: a thickness along the optical axis X of the third lens L3,
D4: a thickness along the optical axis X of the fourth lens L4,
T1: a distance along the optical axis X from an image-side surface of the first lens L1 to an object-side surface of the second lens L2,
T2: a distance along the optical axis X from an image-side surface of the second lens L2 to an object-side surface of the third lens L3,
T3: a distance along the optical axis X from an image-side surface of the third lens L3 to an object-side surface of the fourth lens L4,
T4: a distance along the optical axis X from an image-side surface of the fourth lens L4 to an object-side surface of the fifth lens L5,
TTL: a total track length,
EPd: an entrance pupil diameter,
f: a focal length of the overall optical system of the imaging lens,
f1: a focal length of the first lens L1,
f2: a focal length of the second lens L2,
f5: a focal length of the fifth lens L5,
f23: a composite focal length of the second lens L2 and the third lens L3,
f45: a composite focal length of the fourth lens L4 and the fifth lens L5,
r2: paraxial curvature radius of an image-side surface of the first lens L1,
r3: paraxial curvature radius of an object-side surface of the second lens L2,
r4: paraxial curvature radius of an image-side surface of the second lens L2, and
r9: paraxial curvature radius of an object-side surface of the fifth lens L5.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (17a).

$$0.85 < vd3/vd4 < 1.15 \tag{1a}$$

$$0.65 < r2/f < 1.05 \tag{2a}$$

$$2.75 < r9/f < 5.00 \tag{3a}$$

$$0.85 < (T1/f) \times 100 < 1.25 \tag{4a}$$

$$9.00 < f2/f5 < 16.00 \tag{5a}$$

$$4.00 < (T4/f) \times 100 < 7.50 \tag{6a}$$

$$0.08 < T1/T2 < 0.14 \tag{7a}$$

$$0.90 < D3/T3 < 1.25 \tag{8a}$$

$$2.20 < D4/T4 < 3.20 \tag{9a}$$

$$0.65 < r3/f < 1.00 \tag{10a}$$

$$0.85 < r3/r4 < 1.30 \tag{11a}$$

$$-13.00 < f2/f < -5.00 \tag{12a}$$

$$TTL/EPd \leq 2.20 \tag{13a}$$

$$-0.90 < (D2/f2) \times 100 < -0.65 \tag{14a}$$

$$0.80 < f1/f < 1.35 \tag{15a}$$

$$-10.50 < f23/f < -5.00 \tag{16a}$$

$$70.00 < f45/f \tag{17a}$$

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20}$$

Equation 1

Next, examples of the imaging lens according to this embodiment will be explained. In each example, f denotes the focal length of the overall optical system of the imaging lens, Fno denotes an F-number, ω denotes a half field of view, ih denotes a maximum image height, and TTL denotes a total track length. Additionally, i denotes surface number counted from the object side, r denotes the paraxial curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example 1

Unit mm

| f = 3.63 | i h = 2.93 |
|---|---|
| Fno = 1.80 | TTL = 4.24 |
| ω(°) = 38.5 | |

Surface Data

| Surface Number I | Curvature Radius r | Surface Distance d | Refractive Index Nd | Abbe Number vd |
|---|---|---|---|---|
| (Object) | Infinity | Infinity | | |
| 1 (Stop) | Infinity | −0.3598 | | |
| 2* | 1.3819 | 0.6210 | 1.544 | 55.86 (vd1) |
| 3* | 3.1957 | 0.0403 | | |
| 4* | 2.8925 | 0.2100 | 1.671 | 19.48 (vd2) |
| 5* | 2.4609 | 0.3636 | | |
| 6* | Inifnity | 0.3834 | 1.535 | 55.66 (vd3) |
| 7* | Inifnity | 0.3582 | | |
| 8* | −5.0815 | 0.5524 | 1.544 | 55.86 (vd4) |
| 9* | −1.2094 | 0.2150 | | |
| 10* | 14.3437 | 0.4553 | 1.535 | 55.66 (vd5) |
| 11* | 1.1430 | 0.4000 | | |
| 18 | Infinity | 0.2100 | 1.517 | 64.20 |
| 19 | Infinity | 0.4996 | | |
| Image Plane | Infinity | | | |

Constituent Lens Data

| Lens | Start Surface | Focal Length | Composite Focal Length | | Entrance pupil diameter | |
|---|---|---|---|---|---|---|
| 1 | 2 | 3.991 | f23 | −30.526 | EPd | 2.017 |
| 2 | 4 | −30.526 | f45 | 732.341 | | |
| 3 | 6 | Infinity | | | | |
| 4 | 8 | 2.776 | | | | |
| 5 | 10 | −2.351 | | | | |

Aspheric Surface Data

| | Second Surface | Third Surface | Fourth Surface | Fifth Surface | Sixth Surface |
|---|---|---|---|---|---|
| k | 1.094850E−01 | 5.159893E−01 | 4.336670E−01 | −7.250467E−01 | −1.000000E+00 |
| A4 | 1.963090E−02 | −3.478435E−01 | −3.932523E−01 | 1.597878E−01 | 1.712448E−02 |
| A6 | −1.965316E−01 | −1.585724E+00 | −2.014276E+00 | −4.941724E+00 | −2.796328E+00 |
| A8 | 8.445733E−01 | 1.495298E+01 | 1.972350E+01 | 4.367168E+01 | 1.981598E+01 |
| A10 | −1.958527E+00 | −5.598312E+01 | −7.580828E+01 | −2.110428E+02 | −8.596558E+01 |
| A12 | 2.045365E+00 | 1.243143E+02 | 1.738658E+02 | 6.382435E+02 | 2.345025E+02 |
| A14 | 2.469822E−01 | −1.740764E+02 | −2.520192E+02 | −1.227197E+03 | −4.047148E+02 |
| A16 | −2.818170E+00 | 1.504530E+02 | 2.276889E+02 | 1.456250E+03 | 4.287236E+02 |
| A18 | 2.554451E+00 | −7.324215E+01 | −1.159880E+02 | −9.716176E+02 | −2.548004E+02 |
| A20 | −7.714514E−01 | 1.533838E+01 | 2.547475E+01 | 2.789419E+02 | 6.547661E+01 |

TABLE 1-continued

Example 1

|   | Seventh Surface | Eighth Surface | Ninth Surface | Tenth Surface | Eleventh Surface |
|---|---|---|---|---|---|
| k   | −1.000000E+00 | 0.000000E+00  | −2.466285E+00 | 2.171846E+01  | −5.799982E+00 |
| A4  | −1.395394E−01 | 7.600523E−02  | 7.126290E−02  | −3.359768E−01 | −2.172774E−01 |
| A6  | 1.574205E−01  | −3.141305E−01 | −2.638511E−01 | 1.605923E−01  | 1.843677E−01  |
| A8  | −1.781540E+00 | 4.714353E−01  | 3.940781E−01  | 1.777543E−02  | −1.200356E−01 |
| A10 | 6.682577E+00  | −8.855708E−01 | −3.913931E−01 | −5.011791E−02 | 5 542673E−02  |
| A12 | −1.425418E+01 | 1.521222E+00  | 2.656622E−01  | 2.664113E−02  | −1.752291E−02 |
| A14 | 1.842587E+01  | −1.851934E+00 | −9.018800E−02 | −7.856430E−03 | 3.617590E−03  |
| A16 | −1.434340E+01 | 1.376567E+00  | 1.554599E−02  | 1.409900E−03  | −4.569088E−04 |
| A18 | 8.219672E+00  | −5.480955E−01 | 6.793580E−03  | −1.409780E−04 | 3.138665E−05  |
| A20 | −1.142116E+00 | 8.920000E−02  | −1.211420E−03 | 5.992440E−06  | −8.704106E−07 |

The imaging lens in Example 1 satisfies conditional expressions (1) to (17) as shown in Table 5.

Figure 2:
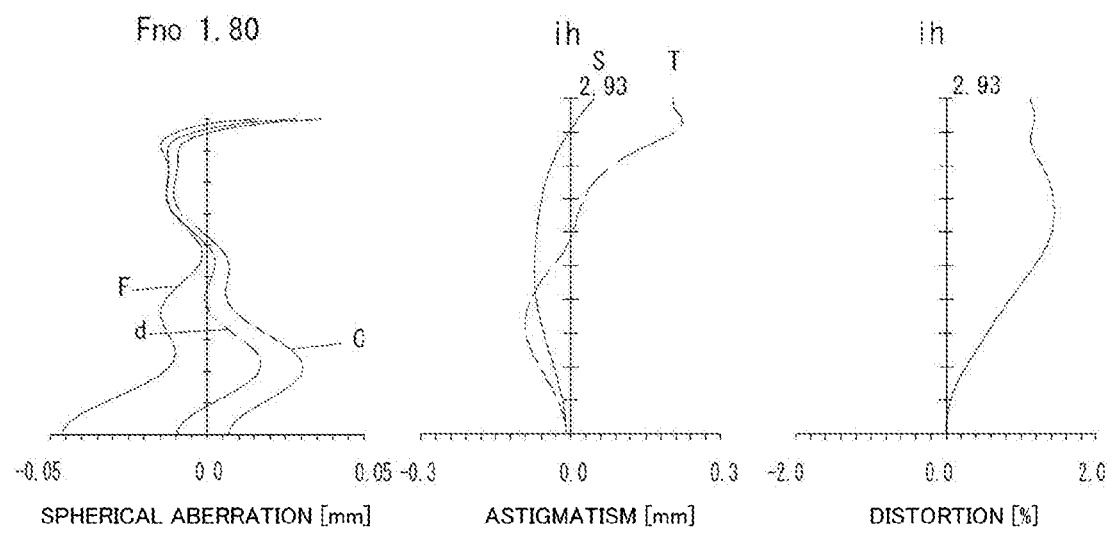
FIG. 2 shows spherical aberration, astigmatism, and distortion of the imaging lens in Example 1 according to the present invention.
Figure 3:
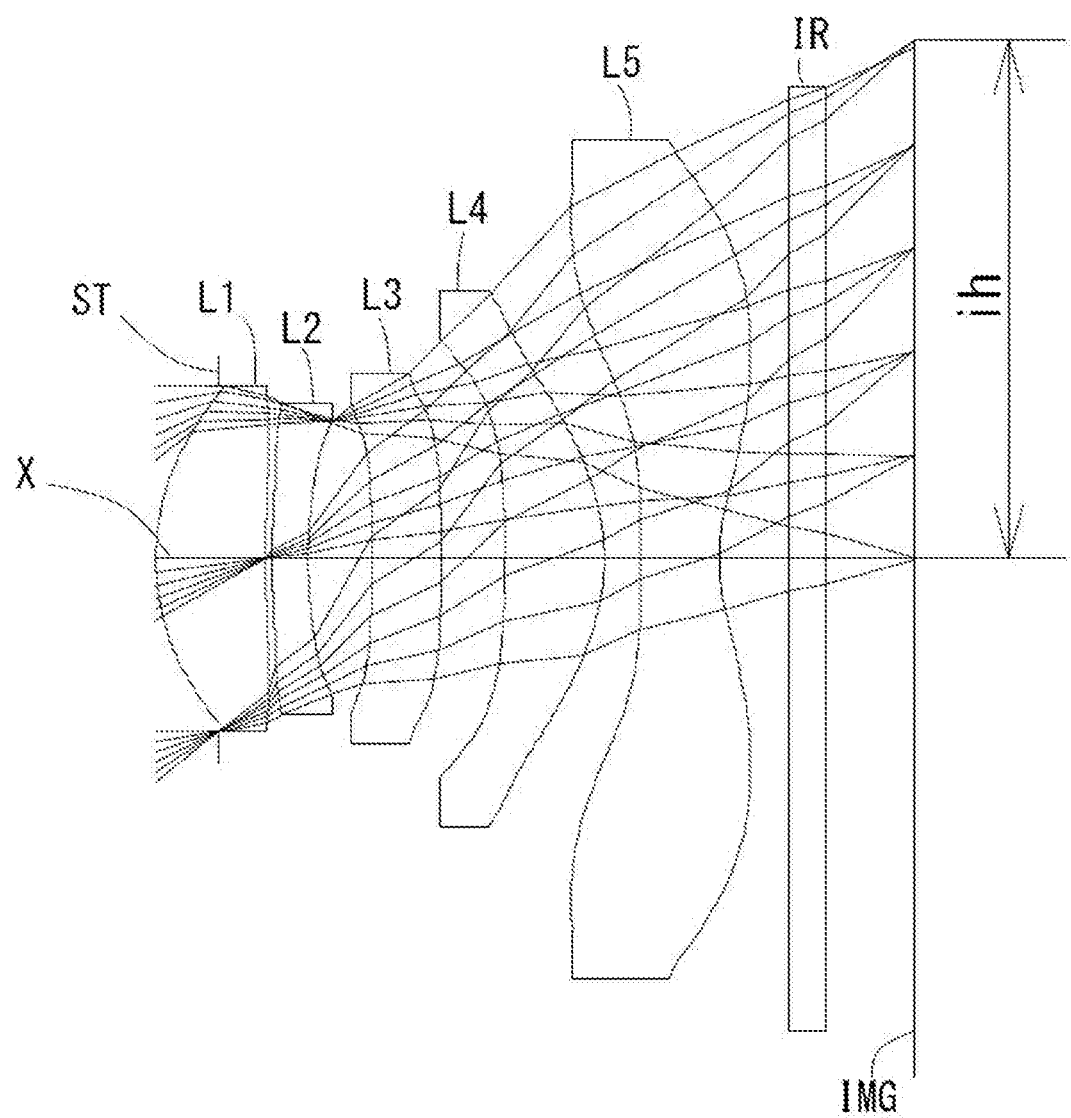
FIG. 3 is a schematic view showing an imaging lens in Example 2 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6 and 8). As shown in FIG. 2, each aberration is corrected excellently.

Example 2

The basic lens data is shown below in Table 2.

TABLE 2

Example 2

Unit mm f = 3.63    i h = 2.93
Fno = 1.80  TTL = 4.24
ω(°) = 38.5

Surface Data

| Surface Number I | Curvature Radius r | Surface Distance d | Refractive Index Nd | Abbe Number vd |
|---|---|---|---|---|
| (Object)   | Infinity  | Infinity |       |            |
| 1 (Stop)   | Infinity  | −0.3535  |       |            |
| 2*         | 1.3731    | 0.6195   | 1.544 | 55.86 (vd1)|
| 3*         | 3 2879    | 0.0400   |       |            |
| 4*         | 3.0454    | 0.2050   | 1.671 | 19.48 (vd2)|
| 5*         | 2.5197    | 0.3584   |       |            |
| 6*         | Inifnity  | 0.3929   | 1.535 | 55.66 (vd3)|
| 7*         | Inifnity  | 0.3716   |       |            |
| 8*         | −4.8278   | 0.5599   | 1.544 | 55.86 (vd3)|
| 9*         | −1.1754   | 0.2007   |       |            |
| 10*        | 12.5693   | 0.4513   | 1.535 | 55.66 (vd5)|
| 11*        | 1.1042    | 0.4000   |       |            |
| 18         | Infinity  | 0.2100   | 1.517 | 64.20      |
| 19         | Infinity  | 0.4994   |       |            |
| Image Plane| Infinity  |          |       |            |

Constituent Lens Data

| Lens | Start Surface | Focal Length | Composite Focal Length | | Entrance pupil diameter | |
|---|---|---|---|---|---|---|
| 1 | 2  | 3.888    | f23 | −25.778    | EPd | 2.015 |
| 2 | 4  | −25.778  | f45 | 12456.950  |     |       |
| 3 | 6  | Infinity |     |            |     |       |
| 4 | 8  | 2.711    |     |            |     |       |
| 5 | 10 | −2.295   |     |            |     |       |

Aspheric Surface Data

|    | Second Surface | Third Surface | Fourth Surface | Fifth Surface | Sixth Surface |
|----|---|---|---|---|---|
| k  | 8.738263E−02  | 5.159893E−01  | 9.534546E−01  | −1.066967E+00 | −1.000000E+00 |
| A4 | −1.484794E−02 | −3.940857E−01 | −4.853926E−01 | 2.518315E−02  | −2.822121E−02 |
| A6 | 2.343453E−01  | −1 201658E+00 | −1.068783E+00 | −3.161572E+00 | −2.410789E+00 |
| A8 | −1.914350E+00 | 1.374961E+01  | 1.484948E+01  | 3.120328E+01  | 1.827395E+01  |

TABLE 2-continued

| | | | Example 2 | | |
|---|---|---|---|---|---|
| A10 | 8.370375E+00 | −5.497832E+01 | −5.981522E+01 | −1.585349E+02 | −8.460972E+01 |
| A12 | −2.172061E+01 | 1.283613E+02 | 1.388654E+02 | 5.019304E+02 | 2.463512E+02 |
| A14 | 3.423647E+01 | −1.876625E+02 | −2.013390E+02 | −1.011367E+03 | −4.537118E+02 |
| A16 | −3.224610E+01 | 1.683651E+02 | 1.791137E+02 | 1.259282E+03 | 5.126048E+02 |
| A18 | 1.666603E+01 | −8.464390E+01 | −8.909230E+01 | −8.823785E+02 | −3.245385E+02 |
| A20 | −3.649447E+00 | 1.823811E+01 | 1.889822E+01 | 2.662613E+02 | 8.857284E+01 |

| | Seventh Surface | Eighth Surface | Ninth Surface | Tenth Surface | Eleventh Surface |
|---|---|---|---|---|---|
| k | −1.000000E+00 | 0.000000E+00 | −2.314011E+00 | 2.171846E+01 | −5.799982E+00 |
| A4 | −1.413775E−01 | 6.605460E−02 | 7.177787E−02 | −3.499849E−01 | −2.135550E−01 |
| A6 | 8.793969E−02 | −3.753137E−01 | −2.777709E−01 | 2.124389E−01 | 1.858305E−01 |
| A8 | −1.197918E+00 | 7.248172E−01 | 4.540283E−01 | −3.932331E−02 | −1.223597E−01 |
| A10 | 4.799631E+00 | −1.281163E+00 | −5.097521E−01 | −1.873234E−02 | 5.682121E−02 |
| A12 | −1.092398E+01 | 1.652152E+00 | 3.921725E−01 | 1.590078E−02 | −1.789417E−02 |
| A14 | 1.511163E+01 | −1.460787E+00 | −1.732363E−01 | −5.457216E−03 | 3 698436E−03 |
| A16 | −1.260304E+01 | 8.268979E−01 | 3.529859E−02 | 1.030084E−03 | −4.699846E−04 |
| A18 | 5.846298E+00 | −2.642727E−01 | −9.049300E−04 | −1.029953E−04 | 3.282584E−05 |
| A20 | −1.142116E+00 | 3.620000E−02 | −4.676916E−04 | 4.236171E−06 | −9.463898E−07 |

The imaging lens in Example 2 satisfies conditional expressions (1) to (17) as shown in Table 5.

Figure 4:
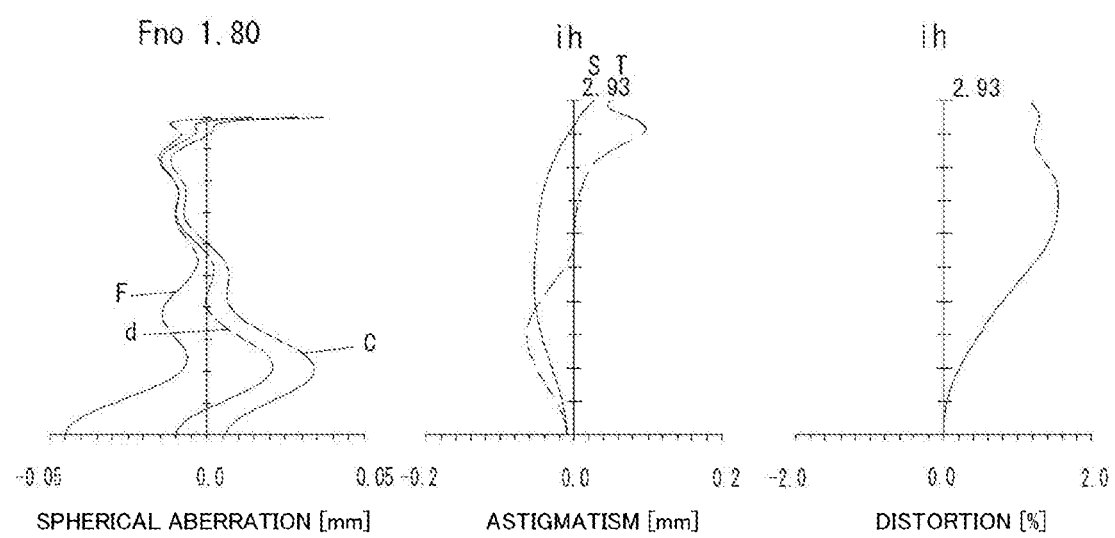
FIG. 4 shows spherical aberration, astigmatism, and distortion of the imaging lens in Example 2 according to the present invention.
Figure 5:
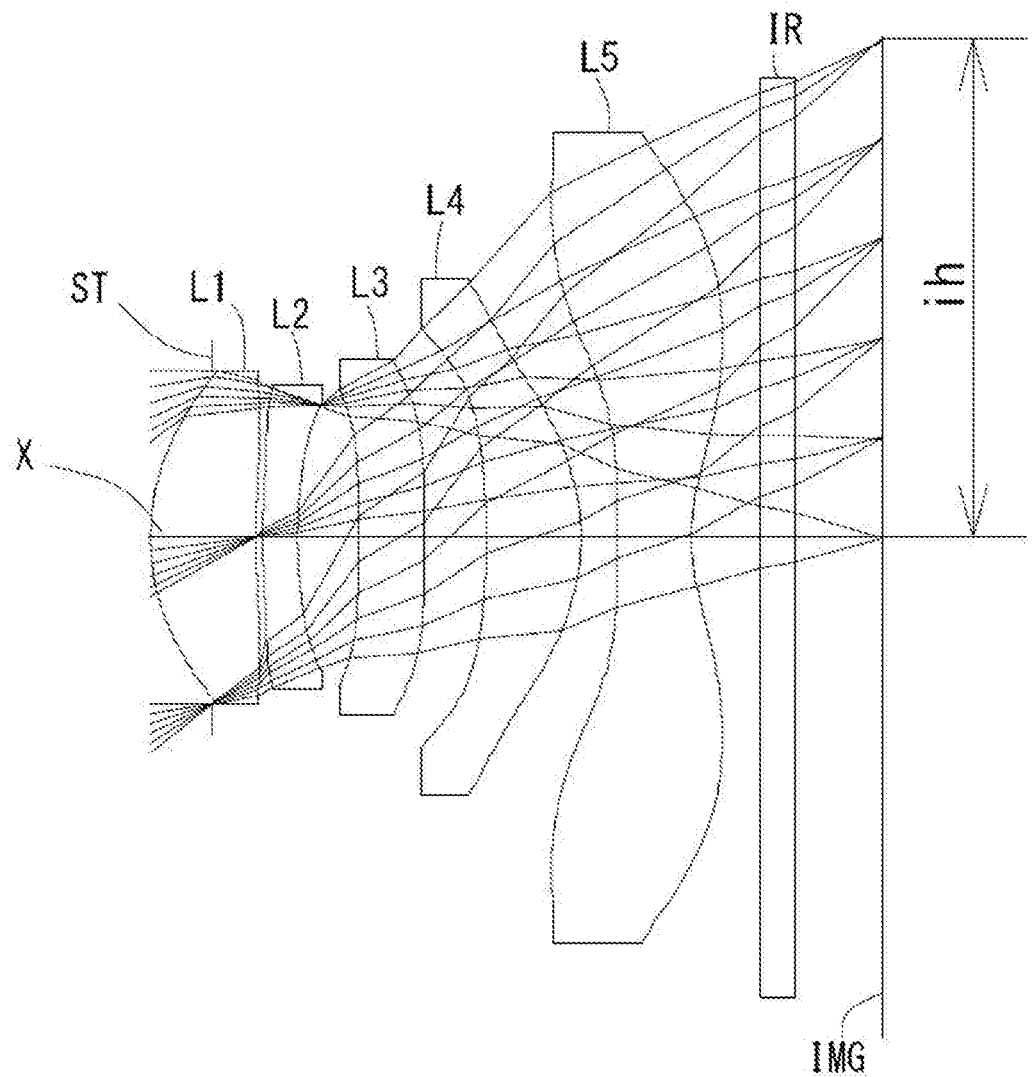
FIG. 5 is a schematic view showing an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

| | | Example 3 | | |
|---|---|---|---|---|
| | | Unit mm | | |
| | f = 3.63 | | i h = 2.93 | |
| | Fno = 1.80 | | TTL = 4.24 | |
| | ω(°) = 38.5 | | | |

| | | Surface Data | | |
|---|---|---|---|---|
| Surface Number I | Curvature Radius r | Surface Distance d | Refractive Index Nd | Abbe Number νd |
| (Object) | Infinity | Infinity | | |
| 1 (Stop) | Infinity | −0.3576 | | |
| 2* | 1.3712 | 0.6187 | 1.544 | 55.86 (vd1) |
| 3* | 3.2598 | 0.0408 | | |
| 4* | 3.0691 | 0.2050 | 1.671 | 19.48 (vd2) |
| 5* | 2.5432 | 0 3584 | | |
| 6* | Inifnity | 0.3856 | 1.535 | 55.66 (vd3) |
| 7* | Inifnity | 0.3673 | | |
| 8* | −4 4872 | 0.5615 | 1.544 | 55.86 (vd4) |
| 9* | −1.1532 | 0.2030 | | |
| 10* | 11.6591 | 0.4437 | 1.535 | 55.66 (vd5) |
| 11* | 1.0983 | 0.4000 | | |
| 18 | Infinity | 0.2100 | 1.517 | 64.20 |
| 19 | Infinity | 0.5145 | | |
| Image Plane | Infinity | | | |

| | | Constituent Lens Data | | | |
|---|---|---|---|---|---|
| Lens | Start Surface | Focal Length | Composite Focal Length | | Entrance pupil diameter |
| 1 | 2 | 3.898 | f23 | −26.207 | EPd 2.015 |
| 2 | 4 | −26.207 | f45 | 359.519 | |
| 3 | 6 | Infinity | | | |
| 4 | 8 | 2.692 | | | |
| 5 | 10 | −2.301 | | | |

TABLE 3-continued

Example 3

Aspheric Surface Data

|     | Second Surface | Third Surface | Fourth Surface | Fifth Surface | Sixth Surface |
| --- | --- | --- | --- | --- | --- |
| k   | 8.383528E−02 | 5.159893E−01 | 1.066306E+00 | −9.814557E−01 | −1.000000E+00 |
| A4  | −1.894990E−02 | −3.616493E−01 | −4.480912E−01 | 1.629409E−02 | −4.668614E−02 |
| A6  | 2.929541E−01 | −1.553735E+00 | −1.458195E+00 | −2.909055E+00 | −1.922501E+00 |
| A8  | −2.344762E+00 | 1.557759E+01 | 1.680218E+01 | 2.832357E+01 | 1.318006E+01 |
| A10 | 1.015402E+01 | −6.075976E+01 | −6.541353E+01 | −1.408133E+02 | −5.577081E+01 |
| A12 | −2.619725E+01 | 1.399965E+02 | 1.482942E+02 | 4.376881E+02 | 1.492152E+02 |
| A14 | 4.116742E+01 | −2.025015E+02 | −2.100304E+02 | −8.694893E+02 | −2.538363E+02 |
| A16 | −3.870242E+01 | 1.798641E+02 | 1.821384E+02 | 1.071270E+03 | 2.662811E+02 |
| A18 | 1.997579E+01 | −8.952364E+01 | −8.800716E+01 | −7.449257E+02 | −1.576897E+02 |
| A20 | −4.365525E+00 | 1.909439E+01 | 1.804471E+01 | 2.236398E+02 | 4.083573E+01 |

|     | Seventh Surface | Eighth Surface | Ninth Surface | Tenth Surface | Eleventh Surface |
| --- | --- | --- | --- | --- | --- |
| k   | −1.000000E+00 | 0.000000E+00 | −2.302780E+00 | 2.171846E+01 | −5.799983E+00 |
| A4  | −1.218317E−01 | 7.516854E−02 | 7.646362E−02 | −3.392410E−01 | −2.115185E−01 |
| A6  | −8.431598E−02 | −4.593756E−01 | −2.902381E−01 | 1.974353E−01 | 1.823209E−01 |
| A8  | −3.223502E−01 | 1.082886E+00 | 4.568366E−01 | −2.791666E−02 | −1.195869E−01 |
| A10 | 2.187057E+00 | −2.183614E+00 | −4.828303E−01 | −2.545613E−02 | 5.527455E−02 |
| A12 | −6.304358E+00 | 3.037362E+00 | 3.356138E−01 | 1.881360E−02 | −1.747832E−02 |
| A14 | 1.034338E+01 | −2.777325E+00 | −1.188046E−01 | −6.299714E−03 | 3.617663E−03 |
| A16 | −9.963075E+00 | 1.576681E+00 | 7.756817E−03 | 1.181492E−03 | −4.603588E−04 |
| A18 | 5.244292E+00 | −4.958395E−01 | 6.155387E−03 | −1.183193E−04 | 3.216932E−05 |
| A20 | −1.142116E+00 | 6.580000E−02 | −1.191835E−03 | 4.907140E−06 | −9.261991E−07 |

The imaging lens in Example 3 satisfies conditional expressions (1) to (17) as shown in Table 5.

Figure 6:
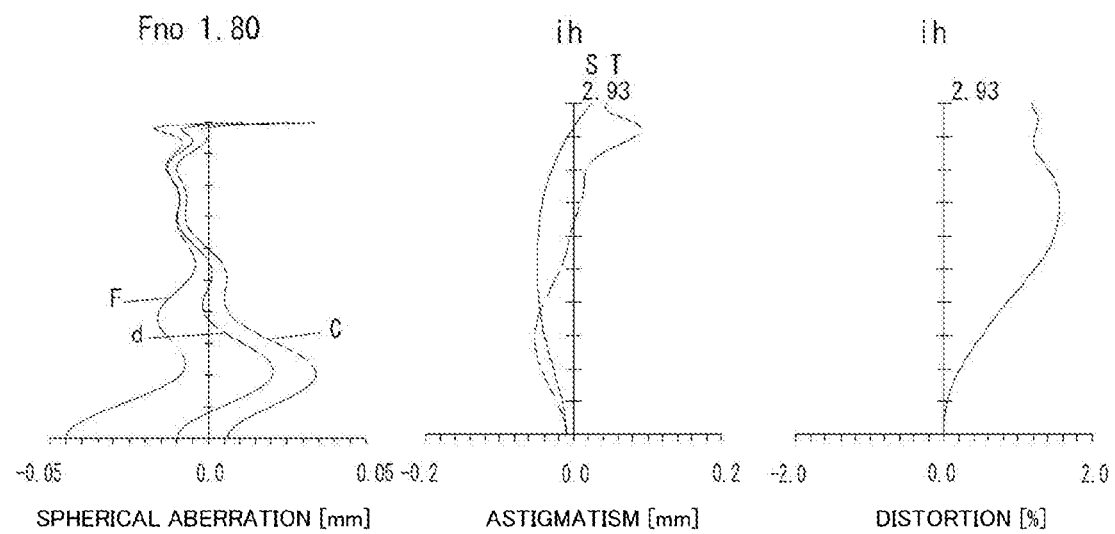
FIG. 6 shows spherical aberration, astigmatism, and distortion of the imaging lens in Example 3 according to the present invention.
Figure 7:
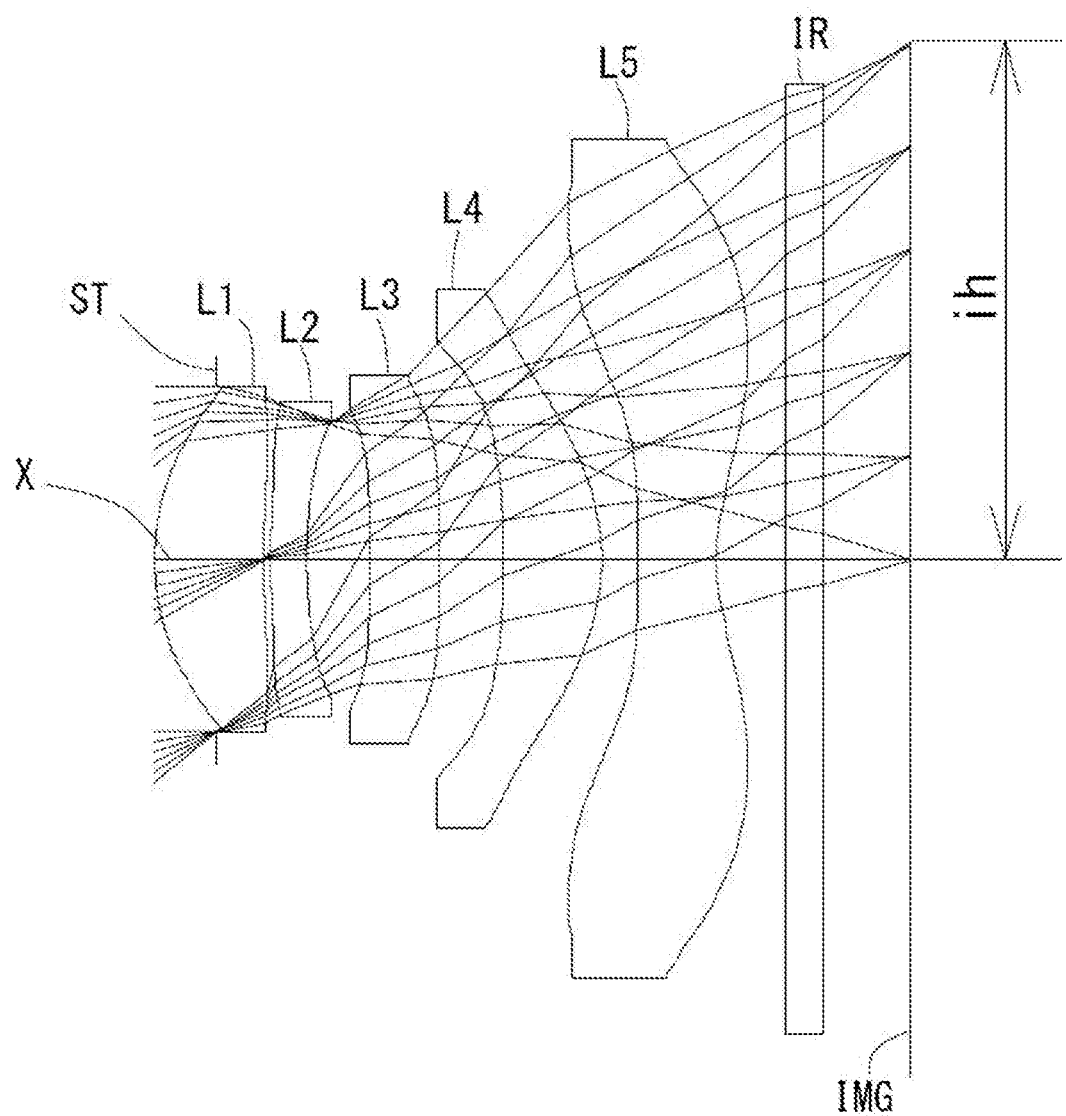
FIG. 7 is a schematic view showing an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4

Unit mm f = 3.63　　　i h = 2.93
Fno = 1.80　　TTL = 4.24
ω(°) = 38.5

Surface Data

| Surface Number I | Curvature Radius r | Surface Distance d | Refractive Index Nd | Abbe Number vd |
| --- | --- | --- | --- | --- |
| (Object) | Infinity | Infinity | | |
| 1 (Stop) | Infinity | −0.3545 | | |
| 2* | 1.3717 | 0.6198 | 1.544 | 55.86 (vd1) |
| 3* | 3.2869 | 0.0400 | | |
| 4* | 3.0632 | 0.2050 | 1.671 | 19.48 (vd2) |
| 5* | 2.5296 | 0.3586 | | |
| 6* | Inifnity | 0.3945 | 1.535 | 55.66 (vd3) |
| 7* | Inifnity | 0.3889 | | |
| 8* | −4.7497 | 0.5605 | 1.544 | 55.86 (vd4) |
| 9* | −1.1692 | 0.2000 | | |
| 10* | 12.5129 | 0.4497 | 1.535 | 55.66 (vd5) |
| 11* | 1.1010 | 0.4000 | | |
| 18 | Infinity | 0.2100 | 1.517 | 64.20 |
| 19 | Infinity | 0.5015 | | |
| Image Plane | Infinity | | | |

TABLE 4-continued

Example 4

Constituent Lens Data

| Lens | Start Surface | Focal Length | Composite Focal Length | | Entrance pupil diameter | |
|---|---|---|---|---|---|---|
| 1 | 2 | 3.882 | f23 | −25.572 | EPd | 2.014 |
| 2 | 4 | −25.572 | f45 | 3895.122 | | |
| 3 | 6 | Infinity | | | | |
| 4 | 8 | 2.701 | | | | |
| 5 | 10 | −2.289 | | | | |

Aspheric Surface Data

| | Second Surface | Third Surface | Fourth Surface | Fifth Surface | Sixth Surface |
|---|---|---|---|---|---|
| k | 8.649794E−02 | 5.159893E−01 | 9.875174E−01 | −1.103670E+00 | −1.000000E+00 |
| A4 | −1.360465E−02 | −3.742858E−01 | −4.641731E−01 | 1.276310E−02 | −2.345572E−02 |
| A6 | 2.106143E−01 | −1.490420E+00 | −1.396205E+00 | −2.905771E+00 | −2.564865E+00 |
| A8 | −1 728106E+00 | 1.566564E+01 | 1.719896E+01 | 2.847458E+01 | 1.987389E+01 |
| A10 | 7.606057E+00 | −6.232724E+01 | −6.958586E+01 | −1.418627E+02 | −9.324960E+01 |
| A12 | −1.988381E+01 | 1.457249E+02 | 1.639847E+02 | 4.402548E+02 | 2.735745E+02 |
| A14 | 3.154501E+01 | −2.132905E+02 | −2.417780E+02 | −8.706507E+02 | −5.057554E+02 |
| A16 | −2.987138E+01 | 1.913685E+02 | 2.187706E+02 | 1.065753E+03 | 5.721784E+02 |
| A18 | 1.550235E+01 | −9.612243E+01 | −1.107379E+02 | −7.353614E+02 | −3.621831E+02 |
| A20 | −3.405623E+00 | 2.067931E+01 | 2.393955E+01 | 2.189109E+02 | 9.868621E+01 |

| | Seventh Surface | Eighth Surface | Ninth Surface | Tenth Surface | Eleventh Surface |
|---|---|---|---|---|---|
| k | −1.000000E+00 | 0.000000E+00 | −2.295281E+00 | 2.171846E+01 | −5.799982E+00 |
| A4 | −1.242622E−01 | 7.646192E−02 | 7.088234E−02 | −3.537949E−01 | −2.159761E−01 |
| A6 | −5.128998E−02 | −4.682300E−01 | −2.701391E−01 | 2.239803E−01 | 1.903744E−01 |
| A8 | −5.770820E−01 | 1.109443E+00 | 4.258682E−01 | −5.047134E−02 | −1.283921E−01 |
| A10 | 3.180935E+00 | −2.190300E+00 | −4.463583E−01 | −1.415896E−02 | 5.888501E−02 |
| A12 | −8.386006E+00 | 2.967309E+00 | 3.122519E−01 | 1.543293E−02 | −1.854378E−02 |
| A14 | 1.276300E+01 | −2.642098E+00 | −1.161675E−01 | −5.737179E−03 | 3.822763E−03 |
| A16 | −1.142003E+01 | 1.464422E+00 | 1.213908E−02 | 1.142934E−03 | −4.833352E−04 |
| A18 | 5.596458E+00 | −4.520453E−01 | 4.102200E−03 | −1.195857E−04 | 3.346811E−05 |
| A20 | −1.143000E+00 | 5.913427E−02 | −9.174172E−04 | 5.141248E−05 | −9.505715E−07 |

The imaging lens in Example 4 satisfies conditional expressions (1) to (17) as shown in Table 5.

Figure 8:
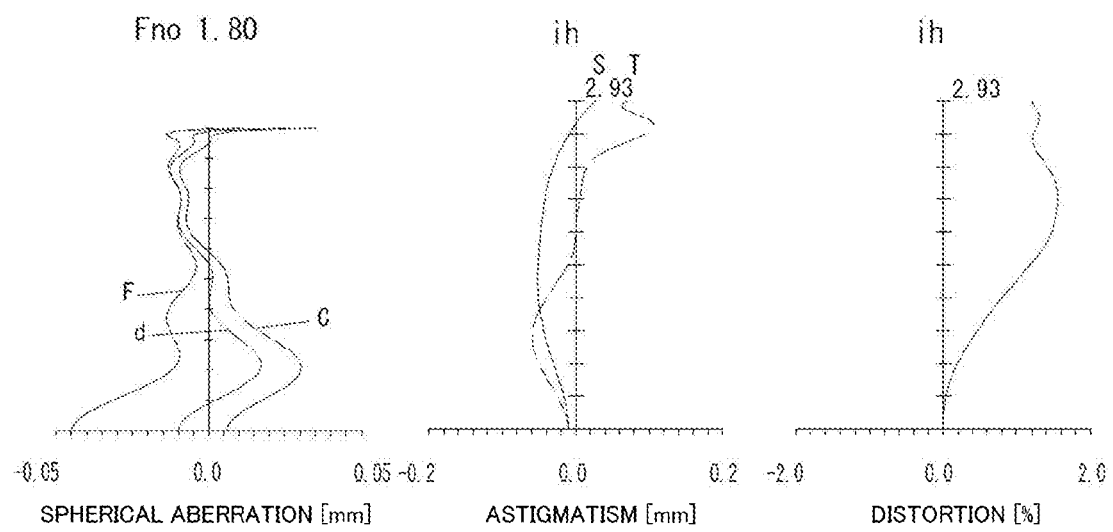
FIG. 8 shows spherical aberration, astigmatism, and distortion of the imaging lens in Example 4 according to the present invention.

FIG. 8 shows spherical aberration (mm), astigmatism (mm), and distortion (%) of the imaging lens in Example 4. As shown in FIG. 8, each aberration is corrected excellently.

In table 5, values of conditional expressions (1) to (17) related to the Examples 1 to 4 are shown.

TABLE 5

| | Conditional expression | Example1 | Example2 | Example3 | Example4 |
|---|---|---|---|---|---|
| (1) | vd3/vd4 | 1.00 | 1.00 | 1.00 | 1.00 |
| (2) | r2/f | 0.80 | 0.91 | 0.90 | 0.81 |
| (3) | r9/f | 3.95 | 3.47 | 3.21 | 3.45 |
| (4) | (T1/f) × 100 | 1.11 | 1.10 | 1.12 | 1.10 |
| (5) | f2/f5 | 12.99 | 11.23 | 11.38 | 11.17 |
| (6) | (T4/f) × 100 | 5.92 | 5.53 | 5.60 | 5.52 |
| (7) | T1/T2 | 0.11 | 0.11 | 0.11 | 0.11 |
| (8) | D3/T2 | 1.07 | 1.06 | 1.05 | 1.07 |
| (9) | D4/T4 | 2.57 | 2.79 | 2.77 | 2.80 |
| (10) | r3/f | 0.80 | 0.84 | 0.85 | 0.84 |
| (11) | r3/r4 | 1.10 | 1.21 | 1.21 | 1.21 |
| (12) | f2/f | −8.41 | −7.11 | −7.23 | −7.05 |
| (13) | TTL/EPd | 2.10 | 2.10 | 2.10 | 2.10 |
| (14) | (D2/f2) × 100 | −0.69 | −0.80 | −0.78 | −0.80 |
| (15) | f1/f | 1.10 | 1.07 | 1.07 | 1.07 |
| (16) | f23/f | −8.41 | −7.11 | −7.23 | −7.05 |
| (17) | f45/f | 201.68 | 3435.16 | 99.13 | 1074.25 |

When the imaging lens according to the present invention is adopted to a product with the camera function, there is realized contribution to the wide field of view, the low-profileness and the low F-number of the camera and also high performance thereof.

DESCRIPTION OF REFERENCE NUMERALS

ST: an aperture stop
L1: a first lens
L2: a second lens
L3: a third lens
L4: a fourth lens
L5: a fifth lens
ih: a maximum image height
IR: a filter
IMG: an imaging plane

What is claimed is:

1. An imaging lens comprising in order from an object side to an image side,
   a first lens having a convex surface facing the object side and positive refractive power near an optical axis,
   a second lens having negative refractive power near the optical axis,
   a third lens having aspheric surfaces on both sides,
   a fourth lens, and
   a fifth lens having a concave surface facing the image side and the negative refractive power near the optical axis,
   wherein an image-side surface of said fifth lens is formed as an aspheric surface having at least one pole point in a position off the optical axis, an image-side surface of said first lens is a concave surface facing the image side near the optical axis and below conditional expressions (4), (5) and (10) are satisfied:

$$0.55<(T1/f)\times 100<1.40 \quad (4)$$

$$7.50<f2/f5<19.50 \quad (5)$$

$$0.40<r3/f<1.15 \quad (10)$$

where r3: paraxial curvature radius of an object-side surface of the second lens, T1: a distance along the optical axis from an image-side surface of the first lens to an object-side surface of the second lens, f: a focal length of the overall optical system of the imaging lens, f2: a focal length of the second lens, and f5: a focal length of the fifth lens.

2. The imaging lens according to claim 1, wherein an object-side surface of said fifth lens is a convex surface facing the object side near the optical axis.

3. The imaging lens according to claim 2, wherein a below conditional expression (1) is satisfied:

$$0.70<vd3/vd4<1.30 \quad (1)$$

where vd3: an abbe number at d-ray of the third lens, and vd4: an abbe number at d-ray of the fourth lens.

4. The imaging lens according to claim 2, wherein a below conditional expression (2) is satisfied:

$$0.40<r2/f<1.20 \quad (2)$$

where r2: paraxial curvature radius of an image-side surface of the first lens, and f: a focal length of the overall optical system of the imaging lens.

5. The imaging lens according to claim 2, wherein a below conditional expression (3) is satisfied:

$$2.20<r9/f<6.00 \quad (3)$$

where r9: paraxial curvature radius of an object-side surface of the fifth lens, and f: a focal length of the overall optical system of the imaging lens.

6. The imaging lens according to claim 2, wherein a below conditional expression (11) is satisfied:

$$0.50<r3/r4<1.45 \quad (11)$$

where r3: paraxial curvature radius of an object-side surface of the second lens, and r4: paraxial curvature radius of an image-side surface of the second lens.

7. The imaging lens according to claim 2, wherein a below conditional expression (12) is satisfied:

$$f2/f<-3.50 \quad (12)$$

where f2: a focal length of the second lens, and f: a focal length of the overall optical system of the imaging lens.

8. The imaging lens according to claim 2, wherein a below conditional expression (13) is satisfied:

$$TTL/EPd<2.30 \quad (13)$$

where

EPd: an entrance pupil diameter, and

TTL: a total track length.

* * * * *